(12) United States Patent
German et al.

(10) Patent No.: US 9,388,306 B2
(45) Date of Patent: Jul. 12, 2016

(54) POLYETHYLENE STRETCH FILM (75) Inventors: Paul M. German, Friendswood, TX (US); Carlton B. Johnson, Houston, TX (US); Michael G. Williams, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 684 days.

(21) Appl. No.: 12/867,871

(22) PCT Filed: Mar. 4, 2008

(86) PCT No.: PCT/US2008/055745
§ 371 (c)(1),
(2), (4) Date: Aug. 16, 2010

(87) PCT Pub. No.: WO2009/110887
PCT Pub. Date: Sep. 11, 2009

(65) Prior Publication Data
US 2010/0310892 A1 Dec. 9, 2010

(51) Int. Cl.
| | | |
|---|---|---|
| *B32B 27/32* | (2006.01) | |
| *C08L 23/06* | (2006.01) | |
| *C08L 23/14* | (2006.01) | |
| *C08J 5/18* | (2006.01) | |
| *C08L 23/08* | (2006.01) | |
| *B32B 27/08* | (2006.01) | |
| *B32B 27/18* | (2006.01) | |

(52) U.S. Cl.
CPC .............. *C08L 23/142* (2013.01); *B32B 27/08* (2013.01); *B32B 27/18* (2013.01); *B32B 27/32* (2013.01); *C08J 5/18* (2013.01); *C08L 23/08* (2013.01); *C08L 23/0815* (2013.01); *B32B 2270/00* (2013.01); *B32B 2307/30* (2013.01); *B32B 2307/50* (2013.01); *B32B 2307/51* (2013.01); *B32B 2307/514* (2013.01); *B32B 2307/54* (2013.01); *B32B 2307/558* (2013.01); *B32B 2307/704* (2013.01); *B32B 2307/72* (2013.01); *B32B 2553/00* (2013.01); *C08J 2323/06* (2013.01); *Y10T 428/31938* (2015.04)

(58) Field of Classification Search
CPC ... C08L 23/142; C08L 23/08; C08L 12/0815; Y10T 428/31938; C08J 5/18; B32B 27/08; B32B 27/18; B32B 27/32; B32B 2270/00; B32B 2307/30; B32B 2307/50; B32B 2307/51; B32B 2307/514; B32B 2307/54; B32B 2307/558; B32B 2307/704; B32B 2307/72; B32B 2553/00

See application file for complete search history.

(56) References Cited

U.S. PATENT DOCUMENTS

| | | | |
|---|---|---|---|
| 4,871,813 A | 10/1989 | Senez | |
| 5,085,927 A * | 2/1992 | Dohrer | 428/220 |
| 5,569,693 A | 10/1996 | Doshi et al. | |
| 6,153,702 A | 11/2000 | Somers | |
| 6,423,420 B1 | 7/2002 | Brant et al. | |
| 6,428,901 B1 * | 8/2002 | Agarwal et al. | 428/516 |
| 6,703,439 B2 * | 3/2004 | Yano et al. | 524/515 |
| 6,881,800 B2 | 4/2005 | Friedersdorf | |
| 6,992,158 B2 | 1/2006 | Datta et al. | |
| 7,220,801 B2 | 5/2007 | Dunaway | |
| 2003/0213938 A1 * | 11/2003 | Farley et al. | 252/500 |
| 2004/0048019 A1 | 3/2004 | Ohlsson | |
| 2004/0236042 A1 | 11/2004 | Datta et al. | |
| 2006/0159943 A1 | 7/2006 | Brant et al. | |
| 2006/0281868 A1 | 12/2006 | Sudhin et al. | |
| 2007/0054997 A1 | 3/2007 | Pierini et al. | |
| 2007/0260016 A1 | 11/2007 | Best et al. | |
| 2007/0292693 A1 | 12/2007 | Parkinson et al. | |

FOREIGN PATENT DOCUMENTS

| | | | |
|---|---|---|---|
| WO | WO 00/01745 | 1/2000 | |
| WO | WO 02/36651 | 5/2002 | |
| WO | WO 2006/115839 | 11/2006 | |
| WO | WO 2006115839 A1 * | 11/2006 | B32B 27/32 |
| WO | WO 2007/044544 | 4/2007 | |

OTHER PUBLICATIONS

Cheng, H.N., "C NMR Analysis of Ethylene-Propylene Rubbers" Macromolecules, 1984, vol. 17, pp. 1950-1955.

G. Ver Strate et al. "Near Monodisperse Ethylene-Propylene Copolymers by Direct Ziegler-Natta Polymerization, Preparation, Characterization Properties", Macromolecules, 1988, vol. 21, pp. 3360-3371.

\* cited by examiner

*Primary Examiner* — Callie Shosho
*Assistant Examiner* — John Freeman
(74) *Attorney, Agent, or Firm* — Priya G. Prasad

(57) ABSTRACT

In one aspect is a film comprising: (a) within the range of from 50 to 99 wt % linear low density polyethylene based on the weight of the core composition; and (b) within the range of from 1 to 50 wt % propylene-α-olefin copolymer based on the weight of the core composition, wherein the propylene-α-olefin copolymer possesses: (i) a melting temperature ($T_m$) of less than 105° C., and (ii) a heat of fusion ($H_f$) of less than 75 J/g; wherein the film is a cast or blown film. The films have excellent strength and elasticity and are ideal for such applications as stretch wrap.

14 Claims, 3 Drawing Sheets

US 9,388,306 B2

POLYETHYLENE STRETCH FILM

CROSS-REFERENCE TO RELATED APPLICATIONS

This application is a 371 National Stage Application of International Application No. PCT/US2008EM039, filed Mar. 4, 2008, which is incorporated herein by reference.

FIELD OF THE INVENTION

The present invention relates in general to stretch films made by cast and/or air quenched, blown film processes, and more particularly to stretch linear low density polyethylene (LLDPE) films comprising a propylene-based elastomer to improve the strain hardening of the stretch films.

BACKGROUND OF THE INVENTION

Stretch films are typically used in applications where it is desirable to securely hold and/or wrap an article or a group of articles, such as load palletization. The film is typically stretched tightly around the goods or plurality of articles situated on a pallet, and self-sealed while the film is still in the stretched condition to create a secure package. A limiting performance factor for stretch film is the amount the film can be stretched or elongated as it is being used to secure the package before it either breaks, tears, or begins to lose performance in other key property areas. Thus, it would be desirable to shift the onset of strain hardening to higher strains without sacrificing other important properties.

Stretch films comprising LLDPE and polypropylenes have been disclosed in US 2006/0159943, but lack desirable elasticity and strain hardening improvements over LLDPE alone. The film compositions described in WO 2007/044544 disclose LLDPE blends with propylene-based copolymers. The present invention uses the combination of propylene-based elastomers having excellent elongation and toughness properties to improve the performance of LLDPE resins commonly used in stretch films. The inventive films have delayed onset of strain hardening (higher stretch capability) and/or improved toughness that provides superior performance. Films may be blown and/or cast, monolayer blends and/or co-extrusions. The LLDPE may be conventional Ziegler-Natta LLDPEs or single site catalyzed LLDPEs.

Other disclosures of interest include US 2004/0048019A1, US 2006/0281868, US 2007/0260016, US 2007/0054997A1, U.S. Pat. No. 6,423,420 and U.S. Pat. No. 7,220,801.

SUMMARY OF THE INVENTION

In one aspect is a film comprising greater than 70 wt %, based on the weight of the film, of a core layer comprising a core composition comprising: (a) within the range of from 50 to 99 wt % linear low density polyethylene based on the weight of the core composition; and (b) within the range of from 1 to 50 wt % propylene-α-olefin copolymer based on the weight of the core composition, wherein the propylene-α-olefin copolymer possesses: (i) a melting temperature ($T_m$) of less than 105° C., and (ii) a heat of fusion ($H_f$) of less than 75 J/g.

In another aspect is a film comprising: (a) within the range of from 50 to 99 wt % linear low density polyethylene based on the weight of the core composition; and (b) within the range of from 1 to 50 wt % propylene-α-olefin copolymer based on the weight of the core composition, wherein the propylene-α-olefin copolymer possesses: (i) a melting temperature ($T_m$) of less than 105° C., and (ii) a heat of fusion ($H_f$) of less than 75 J/g; wherein the film is a cast film.

In another aspect is a method of forming a film of any of the preceding numbered embodiments comprising (1) forming a melt blend at a temperature of from 150 to 350° C. of (a) within the range of from 50 to 99 wt % linear low density polyethylene based on the weight of the core composition; and (b) within the range of from 1 to 50 wt % propylene-α-olefin copolymer based on the weight of the core composition, wherein the propylene-α-olefin copolymer possesses: (i) a melting temperature ($T_m$) of less than 105° C., and (ii) a heat of fusion ($H_f$) of less than 75 J/g; (2) in an extruder having a L/D of from 50:1 to 20:1, a die temperature of from 150 to 350° C.; wherein in one embodiment the extruder line is run at a throughput of from 100 to 1000 kg/hr and a line speed of from 100 to 1000 m/min. In a particular embodiment of the method, the extruder and line comprise a cast film line possessing a roll temperature of from 0 to 70° C.

As will be understood, the various features of these and other aspects of the invention can be combined with the various embodiments of the elements as described herein.

DETAILED DESCRIPTION OF THE INVENTION

Disclosed in one aspect is a film comprising greater than 70 wt %, based on the weight of the film, of at least one core layer. In one embodiment, the film comprises within the range from 70 or 75 to 80 or 85 or 90 wt %, by weight of the film, of one or more core layers, and within the range from 10 or 15 or 20 to 25 or 30 wt %, by weight of the film, of one or more outer layers, wherein the core layer(s) comprises a core composition. The one or more outer layer(s) comprises at least one non-cling layer and at least one cling layer in certain embodiments.

In certain embodiments, the "core composition" comprises within the range of from 50 or 60 or 70 to 80 or 85 or 90 or 95 or 99 wt % linear low density polyethylene (LLDPE) based on the weight of the core composition; and within the range of from 1 or 5 or 10 or 15 or 20 to 30 or 40 or 50 wt % propylene-α-olefin copolymer, based on the weight of the core composition. In other embodiments, the "core composition" consists essentially of within the range from 50 or 60 or 70 to 80 or 85 or 90 or 95 or 99 wt % linear low density polyethylene (LLDPE) based on the weight of the core composition; and within the range of from 1 or 5 or 10 or 15 or 20 to 30 or 40 or 50 wt % propylene-α-olefin copolymer, based on the weight of the core composition. The propylene-α-olefin copolymer can be described by any number of features, and in one aspect possesses a melting temperature ($T_m$) of less than 105° C., and a heat of fusion ($H_f$) of less than 75 J/g. In a particular embodiment, the one or more core layers consist essentially of one or more LLDPEs and one or more propylene-α-olefin copolymers.

As used herein, the term "layer" is used to refer to each of the one or more compositions, the same or different, that are secured to one another in thin sheet or film-form by any appropriate means such as by an inherent tendency of the materials to adhere to one another, or by inducing the compositions to adhere as by a heating, radiative, chemical, or some other appropriate process. The term "layer" is not limited to detectable, discrete compositions contacting one another such that a distinct boundary exists between the compositions. Preferably however, the composition used to make one layer of a film will be different (i.e., the weight percent of components, the properties of each component, and/or the identity of the components may differ) from the composition used to make an adjacent layer, when present. The term "layer" includes a finished product having a continuum of compositions throughout its thickness. The "films" of the present invention comprise one or more layers, and may comprise two, three or more layers in particular embodiments.

The Propylene-α-Olefin Copolymer Component

The propylene-based elastomer, or "propylene-α-olefin copolymers" described herein, are copolymers of propylene-derived units and one or more units derived from ethylene or a $C_4$-$C_{10}$ α-olefin and optionally one or more diene-derived units. In certain embodiments, the α-olefins are selected from ethylene, 1-butene, 1-hexene and 1-octene. The comonomer content of the copolymer is from 5 to 35 wt % in one embodiment. In general, the comonomer content is adjusted so that the copolymer has a MWD (Mw/Mn) within the range of from 1.5 to 20, a heat of fusion ($H_f$) within the range of from less than or equal to 75 J/g, and a peak melting temperature ($T_m$) within the range of from less than or equal to 105° C. In some embodiments, where more than one comonomer is present, the amount of a particular comonomer may be less than 5 wt %, but the combined comonomer content is greater than 5 wt %. The propylene-α-olefin copolymers may be described by any number of different parameters, and those parameters may comprise a numerical range made up of any desirable upper limit with any desirable lower limit as described herein for the propylene-α-olefin copolymers.

In such an embodiment, when there is more than one α-olefin-derived unit in the copolymer, the total weight percent of the ethylene and/or $C_4$-$C_{10}$ α-olefin-derived units (or "α-olefin") is within the range of from 5 to 35 wt %, and from 7 to 32 wt % in another embodiment, and from 8 to 25 wt % in yet another embodiment, and from 8 to 20 wt % in yet another embodiment, and from 8 to 18 wt % in a particular embodiment. Non-limiting examples of copolymers, or "terpolymers", having more than one α-olefin include propylene-ethylene-octene, propylene-ethylene-hexene and propylene-ethylene-butene polymers. These copolymers may further comprise a diene as described below.

In a particular embodiment, the propylene-α-olefin copolymer comprises propylene-derived units and comonomer units selected from ethylene, 1-hexene and 1-octene. The propylene-α-olefin copolymer comprises from 5 to 25 wt % monomer-derived units in one embodiment, and from 5 to 20 wt % in another embodiment, and from 5 to 16 wt % in yet another embodiment, and from 6 to 18 wt % in yet another embodiment, and from 8 to 20 wt % in yet another embodiment. In a particular embodiment, the comonomer is ethylene, and thus the propylene-α-olefin copolymer is a propylene-ethylene copolymer.

In one embodiment, the propylene-α-olefin copolymer comprises less than or equal to 10 wt % diene derived units (or "diene"), and less than or equal to 5 wt % diene in another embodiment, and less than or equal to 3 wt % diene in another embodiment, and from greater than 0.1 wt % in yet another embodiment, and within the range of from 0.1 to 5 wt % in yet another embodiment, and from 0.1 to 3 wt % in yet another embodiment, and from 0.1 to 2 wt % diene in yet a more particular embodiment. Suitable dienes useful as co-monomers are, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

In certain embodiments, the propylene-α-olefin copolymers have a triad tacticity of three propylene units, as measured by $^{13}$C NMR, of 75% or greater, 80% or greater, 82% or greater, 85% or greater, or 90% or greater. In one embodiment, the triad tacticity is within the range of from 50 to 99%, and from 60 to 99% in another embodiment, and from 75 to 99% in yet another embodiment, and from 80 to 99% in yet another embodiment; and from 60 to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Embodiments of the propylene-α-olefin copolymer have a tacticity index m/r ranging from a lower limit of 4 or 6 to an upper limit of 8 or 10 or 12.

In certain embodiments, the propylene-α-olefin copolymers have a heat of fusion ($H_f$), determined according to the Differential Scanning Calorimetry (DSC) procedure described herein, greater than or equal to 0.5 or 1 or 5 J/g, and is less than or equal to 75 or 70 or 50 or 35 J/g in yet other embodiments. In certain embodiments, the $H_f$ value is within the exemplary ranges of from 10 to 75 J/g, and from 20 to 70 J/g in another embodiment, and from 30 to 60 J/g in yet another embodiment, and from 30 to 75 J/g in yet another embodiment.

In certain embodiments, the propylene-α-olefin copolymers have a percent crystallinity within the range of less than 40%, and within the range of from 0.5 to 40% in another embodiment, and from 1 to 30% in another embodiment, and from 5 to 25% in yet another embodiment, wherein "percent crystallinity" is determined according to the DSC procedure described herein. (The thermal energy for the highest order of polypropylene is estimated at 189 J/g (i.e., 100% crystallinity is equal to 189 J/g)). In another embodiment, the propylene-α-olefin copolymers have a crystallinity within the range of from 0.25 to 25%, and from 0.5 to 22% in yet another embodiment, and from 0.5 to 20% in yet another embodiment.

Propylene-α-olefin copolymers of the present invention have long crystallization half-times requiring an appropriate DSC method. The procedure for DSC determinations is as follows. About 0.5 grams of polymer was weighed out and pressed to a thickness of about 15-20 mils (about 381-508 microns) at about 140° C.-150° C., using a "DSC mold" and Mylar™ as a backing sheet. The pressed pad was allowed to cool to ambient temperature by hanging in air (the Mylar was not removed). The pressed pad was annealed at room temperature (about 23-25° C.) for about 8 days. At the end of this period, an about 15-20 mg disc was removed from the pressed pad using a punch die and was placed in a 10 microliter aluminum sample pan. The sample was placed in a differential scanning calorimeter (Perkin Elmer Pyris 1 Thermal Analysis System) and was cooled to about −100° C. The sample was heated at about 10° C./min to attain a final temperature of about 165° C. The thermal output, recorded as the area under the melting peak of the sample, is a measure of the heat of fusion and can be expressed in Joules per gram (J/g) of polymer and was automatically calculated by the Perkin Elmer System. Under these conditions, the melting profile shows two (2) maxima, the maxima at the highest temperature was taken as the melting point within the range of melting of the sample relative to a baseline measurement for the increasing heat capacity of the polymer as a function of temperature.

In certain embodiments, the propylene-α-olefin copolymers have a single peak melting transition as determined by DSC; in certain embodiments the propylene-α-olefin copolymer has a primary peak melting transition at from less than 90° C., with a broad end-of-melt transition at greater than about 110° C. The peak "melting point" ($T_m$) is defined as the temperature of the greatest heat absorption within the range of melting of the sample. However, the propylene-α-olefin copolymer may show secondary melting peaks adjacent to the principal peak, and or the end-of-melt transition, but for purposes herein, such secondary melting peaks are considered together as a single melting point, with the highest of these peaks being considered the $T_m$ of the propylene-α-olefin copolymer. The propylene-α-olefin copolymers have a peak melting temperature ($T_m$) less than or equal to 65 or 70 or 75 or 80 or 90 or 100 or 105° C. in certain embodiments; and in exemplary ranges, within the range of from 25 to 100° C., and from 25 to 85° C. in another embodiment, and from 25 to 75° C. in yet another embodiment, and from 25 to 65° C. in yet another embodiment.

In certain embodiments, the propylene-α-olefin copolymers have a density within the range of from 0.850 to 0.920 g/cm$^3$, and from 0.870 to 0.900 g/cm$^3$ in another embodiment, and from 0.880 to 0.890 g/cm$^3$ in yet another embodiment, the values measured at room temperature per the ASTM D-1505 test method.

In certain embodiments, the propylene-α-olefin copolymers have a melt flow rate (MFR, ASTM D1238, 2.16 kg, 230° C.), equal to or greater than 0.2 or 0.5 or 1 dg/min, and less than 8 or 10 or 20 or 30 or 40 or 50 or 100 dg/min in other embodiments. In certain exemplary ranges, the MFR is within the range of from 0.5 to 500 dg/min, and from 1 to 250 dg/min in another embodiment, and from 1.5 to 100 dg/min in yet another embodiment, and from 2 to 40 dg/min in yet another embodiment, and from 2 to 20 dg/min in yet another embodiment.

In certain embodiments, the propylene-α-olefin copolymers have a Mooney viscosity value [ML (1+4) @ 125° C.] as determined according to ASTM D1646, of less than 100, and less than 75 in another embodiment, and less than 60 in yet another embodiment, and less than 30 in yet another embodiment, and within the range of from greater than 10 yet another embodiment, and within the range of from greater than 20 in yet another embodiment. In yet another embodiment, the propylene-α-olefin copolymers possess an Elongation at Break (ASTM D 412) of less than 2000%, and less than 1000% in another embodiment, and less than 800% in yet another embodiment, and greater than 400% in yet another embodiment, and greater than 500% in yet another embodiment.

In certain embodiments, the propylene-α-olefin copolymers have a Mw (weight average molecular weight) value within the range of from 5,000 to 5,000,000 g/mole, and from 10,000 to 1,000,000 in another embodiment, and from 50,000 to 400,000 in yet another embodiment. In another embodiment, the propylene-α-olefin copolymers have a Mn (number average molecular weight) value within the range of from 2,500 to 2,500,000 g/mole, and from 10,000 to 250,000 in yet another embodiment, and from 25,000 to 200,000 in yet another embodiment. In yet another embodiment, the propylene-α-olefin copolymers have a Mz value within the range of from 10,000 to 7,000,000 g/mole, and from 80,000 to 700,000 in another embodiment, and from 100,000 to 500,000 in yet another embodiment.

In certain embodiments, the molecular weight distribution (MWD) of the propylene-α-olefin copolymers is within the range of from greater than 1.5 or 1.8 or 2, and within the range of from less than 3 or 4 or 5 or 10 or 20 in particular embodiments. Techniques for determining the molecular weight (Mn, Mz and Mw) and molecular weight distribution (MWD) are as follows, and as in Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system was used at 135° C. with 1,2,4-trichlorobenzene as the mobile phase. Showdex™ (Showa-Denko America, Inc.) polystyrene gel columns 802, 803, 804 and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally accepted standards, e.g., National Bureau of Standards Polyethylene 1484 and anionically produced hydrogenated polyisoprenes (an alternating ethylene-propylene copolymer) demonstrate that such corrections on Mw/Mn or Mz/Mw are less than 0.05 units. Mw/Mn was calculated from an elution time-molecular weight relationship whereas Mz/Mw was evaluated using the light scattering photometer. The numerical analyses can be performed using the commercially available computer software GPC2, MOLWT2 available from LDC/Milton Roy-Riviera Beach, Fla.

The propylene-α-olefin copolymers can include copolymers prepared according to the procedures in WO 02/36651, U.S. Pat. No. 6,992,158, and/or WO 00/01745. Preferred methods for producing the propylene-α-olefin copolymers are found in US Patent Application Publication 2004/0236042 and U.S. Pat. No. 6,881,800. Preferred propylene-α-olefin copolymers are available commercially under the trade names Vistamaxx™ (ExxonMobil Chemical Company, Houston, Tex., USA) and Versify™ (The Dow Chemical Company, Midland, Mich., USA), certain grades of Tafiner™ XM or Notio™ (Mitsui Company, Japan) or certain grades of Softel™ (Basell Polyolefins of the Netherlands).

Although the "propylene-α-olefin copolymer" component of the film compositions has been discussed as a single polymer, the term includes blends of two or more propylene-α-olefin copolymers, preferably, having the properties described herein, are also contemplated.

The Linear Low Density Polyethylene Component

The polymer blend compositions of the present invention may include a linear low density polyethylene (LLDPE) polymer. As used herein, the terms "linear low density polyethylene" polymer and "LLDPE" polymer refer to a homopolymer or copolymer primarily comprising (greater than 50 wt %) ethylene-derived units and having a density of from 0.916 to 0.940 g/cm$^3$. Polymers having more than two types of monomers, such as terpolymers, are also included within the term "copolymer" as used herein. The comonomers that are useful in general for making LLDPE copolymers include α-olefins, such as $C_3$-$C_{20}$ α-olefins and preferably $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In certain embodiments, the comonomers include propylene, 1-butene, 1-pentene, 4-methyl-1-pentene, 1-hexene, 1-octene and styrene, and 1-butene or 1-hexene in a more particular embodiment.

Other useful comonomers include polar, vinyl, conjugated and non-conjugated dienes, acetylene and aldehyde monomers, any of which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allylcyclohexene, vinyl cyclooctene, 4-vinyl cyclohexene, allylcyclodecene, and vinylcyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. In particular embodiments, the diolefins are selected from 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the LLDPE polymer and the specific comonomers selected. One skilled in the art can readily determine the appropriate comonomer content appropriate to produce an LLDPE polymer having a desired density. In certain embodiments, the amount of comonomer-derived units present as part of the LLDPE is within the range of from greater than 0.1 wt %, and greater than 0.2 wt % in another embodiment, and greater than 0.5 wt % in yet another embodiment, and from less than 20 wt % in yet another embodiment, and from less than 18 wt % in another embodiment, and from less than 15 wt % in yet another embodiment, and from less than 10 wt % in yet another particular embodiment.

The LLDPE polymer has a density of 0.916 g/cm$^3$ to 0.940 g/cm$^3$ in one embodiment, and from 0.916 g/cm$^3$ to 0.925 g/cm$^3$ in another embodiment, and from 0.880 to 0.925 g/cm$^3$ in yet another embodiment. The LLDPE polymer can have a melt index of from 0.5 to 50 dg/min, as measured in accordance with ASTM-1238 condition E (2.16 kg @ 190° C.). Alternative lower limits for the melt index include 0.7 and 1.0 dg/min, and alternative upper limits for the melt index include 5, 10, 12, 15 and 20 dg/min, with melt index ranges from any lower limit to any upper limit being within the scope of the invention.

The LLDPE polymer can be produced using any conventional polymerization process and suitable catalyst, such as a Ziegler-Natta catalyst or a metallocene catalyst. In certain embodiments the metallocene made LLDPEs are gas-phase, metallocene catalyzed LLDPEs, such as described in WO 94/26816. Examples of suitable LLDPEs include the metallocene LLDPEs commercially available under the trade name Exceed™ from ExxonMobil Chemical Co., Houston, Tex.; Ziegler-Natta LLDPEs available as ExxonMobil LL series LLDPEs, from ExxonMobil Chemical Co., Houston, Tex., and the Dowlex™ LLDPE resins available from Dow Chemical Co.

Although the "LLDPE" component of the film compositions has been discussed as a single polymer, the term includes blends of two or more LLDPEs, preferably having the properties described herein, are also contemplated.

Preparation of Blends

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well known in the art, and can include, for example: fillers; antioxidants (e.g., hindered phenolics such as Irganox™ 1010 or Irganox™ 1076 available from Ciba Specialty Chemicals); phosphites (e.g., Irgafos™ 168 available from Ciba Specialty Chemicals); anti-cling additives; tackifiers, such as polybutenes, terpene resins, aliphatic and aromatic hydrocarbon resins, alkali metal and glycerol stearates and hydrogenated rosins; UV stabilizers; heat stabilizers; antiblocking agents; release agents; anti-static agents; pigments; colorants; dyes; waxes; silica; fillers; talc and the like.

Films include monolayer or multilayer films prepared with, or incorporating, LLDPE compositions or LLDPE blends. Films include those film structures and film applications known to those skilled in the art. Specific end use films include, for example, cast films, stretch films, stretch/cast films, stretch cling films, stretch handwrap films, machine stretch wrap, shrink films, shrink wrap films, green house films, laminates, and laminate films. Exemplary films are prepared by any conventional technique known to those skilled in the art, such as for example, techniques utilized to prepare blown, extruded, and/or cast stretch and/or shrink films (including shrink-on-shrink applications). The multilayer films may be formed by any number of well known extrusion or coextrusion techniques. Films may be unoriented, uniaxially oriented or biaxially oriented. Physical properties of the film may vary depending on the film forming techniques used.

In another embodiment, the "outer" layer of the films described herein are prepared from LLDPE polymers or blends thereof, and the one or more "core" layers is a blend of LLDPE and propylene-α-olefin. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five or seven layers.

When used in multilayer films, the LLDPE polymer blends may be used in any layer of the film, or in more than one layer of the film, as desired. When more than one layer of the film is formed of an LLDPE polymer blend, each such layer can be individually formulated; that is, the layers formed of the LLDPE polymer blend can be the same or different chemical composition, density, melt index, thickness, etc., depending upon the desired properties of the film.

To facilitate discussion of different film structures, the following notation is used herein. Each layer of a film is denoted "A" or "B", where "A" indicates a conventional film layer as defined below, and "B" indicates a film layer formed of any of the LLDPE and propylene-α-olefin copolymer blends (or "LLDPE:αPP" blend) described herein. Where a film includes more than one A layer or more than one B layer, one or more prime symbols (', '', ''', etc.) are appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of an LLDPE:αPP blend disposed between two outer, conventional film layers would be denoted A/B/A'. Similarly, a five-layer film of alternating conventional/inventive layers would be denoted A/B/A'/B'/A''. Unless otherwise indicated, the left-to-right or right-to-left order of layers does not matter, nor does the order of prime symbols; for example, an A/B film is equivalent to a B/A film, and an A/A'/B/A'' film is equivalent to an A/B/A'/A'' film, for purposes described herein. The relative thickness of each film layer is similarly denoted, with the thickness of each layer relative to a total film thickness of 100 (dimensionless) indicated numerically and separated by slashes; for example, the relative thickness of an A/B/A' film having A and A' layers of 10 μm each and a B layer of 30 μm is denoted as 20/60/20.

For the various films described herein, the "A" layer can be formed of any material known in the art for use in multilayer films or in film-coated products. In some embodiments, the "A" layer is an outer layer, wherein it forms a partial or complete "sandwich" structure with other "A" or "B" layers there between. Thus, for example, the A layer can be formed of a polyethylene homopolymer or copolymer, and the polyethylene can be, for example, a very low density polyethylene (density of less than 0.90 g/cm³; VLDPE), an LDPE, an LLDPE, a medium density polyethylene (density 0.925 to 0.940 g/cm³; MDPE), a high density polyethylene (density greater than 0.940 g/cm³; HDPE), or a differentiated polyethylene (having functional comonomers such as acrylate; DPE), as well as other polyethylenes known in the art. The polyethylene can be produced by any suitable process, including metallocene-catalyzed processes and Ziegler-Natta catalyzed processes. Further, the "A" layer can be a blend of two or more such polyethylenes, and can include additives known in the art, such as for example additives to facilitate cling, or to block such a feature ("anti-block" agent).

In multilayer structures, one or more "A" layers can also be an adhesion-promoting tie layer, such as Primacor™ ethylene-acrylic acid copolymers available from The Dow Chemical Co., and/or ethylene-vinyl acetate copolymers. Other materials for "A" layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, and paper.

The "B" layer, also called the "core" layer, is formed of an LLDPE blend with the propylene-α-olefin copolymer. There can be one, two or more such core layers. In one embodiment, the "B" layer is formed of a blend of (a) from 50 to 99 wt % of one or more LLDPEs, where each LLDPE can be the same or different in its properties; and (b) from 1 to 50 wt % of propylene-α-olefin copolymer(s), where each propylene-α-olefin copolymer can be the same or different in its properties. The copolymer of (b) is characterized by its various features such as $T_m$, $H_f$, crystallinity, comonomer identity and amount, and other variables as described herein.

The thickness of each layer of the film, and of the overall film, is not particularly limited, but is determined according to the desired properties of the film. Typical film layers have a thickness of from 1 to 1000 μm, more typically from 5 to 100 μm, and typical films have an overall thickness of from 10 to 100 μm.

In one embodiment, the present invention provides a single-layer (monolayer) film formed of any of the LLDPE:αPP blends described herein; that is, a film having a single layer which is a "B" layer as described above. Thus, in one embodiment is provided a film comprising within the range of from 50 to 99 wt % linear low density polyethylene based on the weight of the core composition; and within the range of from 1 to 50 wt % propylene-α-olefin copolymer based on the weight of the core composition, wherein the propylene-α-olefin copolymer possesses a melting temperature ($T_m$) of less than 105° C., and a heat of fusion ($H_f$) of less than 75 J/g. In one embodiment the single-layer film is a cast film.

In other embodiments, and using the nomenclature described above, the present invention provides multilayer films with any of the following exemplary structures: (a) two-layer films, such as A/B and B/B; (b) three-layer films, such as A/B/A', A/B/A, A/A'/B, B/A/B' and B/B'/B''; (c) four-layer films, such as A/A'/A''/B, A/A'/B/A'', A/A'/B/B', A/B/A'/B', A/B/B'/A', B/A/A'/B', A/B/B'/B'', B/A/B'/B'' and B/B'/B''/B'''; (d) five-layer films, such as A/A'/A''/A'''/B, A/A'/A''/B/A''', A/A'/B/A''/A''', A/A'/A''/B/B', A/A'/B/A''/B', A/A'/B/B'/A'', A/A'/B/B'/A'', A/B/A'/A''/B, B/A/A'/A''/B', A/A'/B/B'/B'', A/B/A'/B'/B'', A/B/B'/B''/A', B/A/A'/B'/B'', B/A/B'/A'/B'', B/A/B'/B''/A', A/B/B'/B''/B''', B/A/B'/B''/B''', B/B'/A/B''/B''', and B/B'/B''/B'''/B''''; and similar structures for films having six, seven, eight, nine, twenty-four, forty-eight, sixty-four, one hundred, or any other number of layers. It should be appreciated that films having still more layers can be formed using the LLDPE blends of the invention, and such films are within the scope of the invention. In a preferable arrangement, the core or "B" layer is always sandwiched between two "A" or "outer" layers; in one embodiment the outer layers are so called "cling" layers that are well known in the art.

In any of the embodiments above, one or more "A" layers can be replaced with a substrate layer, such as glass, plastic, paper, metal, etc., or the entire film can be coated or laminated onto a substrate. Thus, although the discussion herein has focused on multilayer films, the films of the LLDPE:αPP blends of the present invention can also be used as coatings; for example, films formed of the inventive polymers or polymer blends, or multilayer films including one or more layers formed of the inventive polymers or polymer blends, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in or modifiers applied to each layer.

In one aspect, films containing the polymers and polymer blend compositions, monolayer or multilayer, may be formed by using casting techniques, such as a chill roll casting process. For example, a composition can be extruded in a molten state through a flat die and then cooled to form a film. As a specific example, cast films can be prepared using a cast film line machine as follows. Pellets of the polymer components (or the preformed inventive compositions) are melted and blended at a temperature typically ranging from 250 or 275° C. to 300 or 325 or 340° C. for cast LLDPE resins (depending upon the particular resin used), with the specific melt temperature being chosen to match the melt viscosity of the particular resin layers. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically from 200 or 300 to 500 or 600 or 800 μm. The material is then drawn down to the final gauge. The material draw down ratio is typically 30:1 to 21:1 or 10:1 for 20 μm films. A vacuum box, edge pinners, air knife, or a combination of the foregoing can be used to pin the melt exiting the die opening to a primary chill roll maintained at about 80° F. (32° C.). The resulting polymer film is collected on a winder. The film thickness can be monitored by a gauge monitor, and the film can be edge trimmed by a trimmer. A typical cast line rate is from about 250 to about 2000 feet (76.2 to about 609.6 m) per minute. One skilled in the art will appreciate that higher rates may be used for similar processes such as extrusion coating. One or more optional treaters can be used to surface treat the film, if desired. Such chill roll casting processes and apparatus are well known in the art, and are described, for example, in THE WILEY-ENCYCLOPEDIA OF PACKAGING TECHNOLOGY ($2^{nd}$ ed., A. L. Brody and K. S. Marsh, Eds., John Wiley & Sons, Inc., New York, 1997). Although chill roll casting is one example, other forms of casting may be employed.

In another aspect, films containing LLDPE:αPP blends, monolayer or multilayer, may be formed using blown techniques, i.e., to form a blown film. For example, the composition can be extruded in a molten state through an annular die and then blown and cooled to form a tubular, blown film, which can then be axially slit and unfolded to form a flat film. As a specific example, blown films can be prepared as follows. The polymer blend composition, or the individual components thereof, is introduced into the feed hopper of an extruder, such as a 40 to 50 or 60 or 70 or 80 mm extruder, an example of which is a 63.5 mm Egan extruder, that is water-cooled, resistance heated, and has an L/D ratio within the range of from 10:1 or 12:1 or 15:1 to 25:1 or 30:1 or 40:1. The material is then melt-blended and extruded through a film-forming die. In one embodiment, the film can be produced using a 10 or 15 to 20 or 30 or 40 cm die with a die gap within the range of 1 or 2 to 4 or 5 or 6 die gap; and in a particular embodiment the die possesses a dual orifice non-rotating, non-adjustable air ring. The film is extruded through the die into a film cooled by blowing air onto the surface of the film. The film is drawn from the die typically forming a cylindrical film that is cooled, collapsed and, optionally, subjected to a desired auxiliary process, such as slitting, treating, sealing, or printing. Typical melt temperatures are from 170 or 175° C. to 200 or 225 or 245° C. Blown film rates are generally from 2 or 3 or 4 to 8 or 10 or 15 or 20 or 25 or 30 or 35 kilograms per hour per centimeter of die circumference. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

Any of the foregoing LLDPE compositions or LLDPE:αPP blends may be used in a variety of end-use applications. End use applications include any article containing LLDPE compositions or LLDPE blends. Such end uses may be produced by methods known in the art. End uses include polymer products and products having specific end-uses. Exemplary end uses are films, film-based products, diaper backsheets, housewrap, wire and cable coating compositions, articles formed by molding techniques, for example, injection or blow molding, extrusion coating, foaming, casting, and combinations thereof, each of which is described in more detail in the following paragraphs. End uses also include products made from films, for example, bags, packaging, and personal care films, pouches, medical products, such as for example, medical films and intravenous (IV) bags. In one embodiment, the films of the invention comprise a stretch wrap film.

Advantageously, films formed from the LLDPE:αPP blends described herein possess physical properties similar to or better than those of a film comprising the same LLDPE alone. For instance, 20.3 μm thick films consisting of the core composition (LLDPE:αPP) have the following attributes in certain embodiments: The 1% Secant Modulus MD (measured as described below) for LLDPE:αPP films ranges from 14,000 to 16,000 psi (96.5 to 110.2 MPa), and the TD ranges from 16,000 to 18,000 psi (110.2 to 124.1 MPa). The MD Elmendorf Tear (measured as described below) for the films ranges from 150 to 200 g/mil, and the TD ranges from 450 to 550 g/mil. The Break Energy for the film ranges from 35 in-lb/mil (0.155 N·m/μm) or 40 in-lb/mil (0.177 N·m/μm) to 55 in-lb/mil (0.243 N·m/μm), and from greater than 35 in-lb/mil (0.155 N·m/μm) or 40.0 lb·inch/mil (0.177 N·m/μm) in other embodiments. Also, the 45° Gloss of the films made from the LLDPE:αPP blends ranges from 89 to 95 (MD and TD).

The advantageous properties described above can be achieved under a variety of conditions, and the films described herein are not limited by their method of manufacture. In one embodiment, the films are cast films produced on a cast film line/extruder, and are thus called "cast" films. In certain embodiments, the cast line is run in an extruder having a length to diameter ratio (L/D) of from 50:1 to 20:1, and from 40:1 to 25:1 in another embodiment, and from 35:1 to 27:1 in yet another embodiment. In certain embodiments, the cast line is run at a throughput of from 100 to 1000 kg/hr, and from 150 to 700 kg/hr in another embodiment, and from 220 to 500 kg/hr in yet another embodiment, and from 200 to 400 kg/hr in yet another embodiment. In certain embodiments, the cast line is run at a line speed of from 100 to 1000 m/min, and from 150 to 700 m/min in another embodiment, and from 200 to 400 m/min in yet another embodiment. In certain embodiments, the cast line is run at a melt temperature of from 150 to 350° C., and from 200 to 300° C. in another embodiment, and from 220 to 280° C. in yet another embodiment. In certain embodiments, the cast line is run at a die temperature of from 150 to 350° C., and from 200 to 300° C. in another embodiment, and from 220 to 280° C. in yet another embodiment. And, in certain embodiments, the cast line is run at a cast roll temperature of from 0 to 70° C., and from 10 to 50° C. in another embodiment, and from 20 to 40° C. in another embodiment.

In other particular embodiments, a 20.3 μm thick film comprising the core composition possesses a Strain Hardening value at 2000 psi (13.78 MPa) within the range of from greater than 2 or 4 or 6 or 8 or 10 or 12 or 18% relative to the Strain Hardening value of a 20.3 μm film consisting of the same linear low density polyethylene. This improvement (shift to the right in the curves of FIGS. 1-3) is indicative of the improved properties useful in stretch-wrap films.

EXAMPLES

Monolayer cast films 0.80 mil (20.3 μm) thick were made on Black Clawson cast line; the extruder throughput was 615 lbs/hr, extruder speed at 75 RPM, line speed 750 ft/min, the melt temperature was approximately 480° F., the die temperature was approximately 500° F., the cast roll temperature was 80° F., with a 5.5 inch melt curtain; the film was trimmed to 20 inch width. The extruder has 3½ inch diameter barrel with 30:1 L/D and 150 HP DC drive-Koch SMX static mixer in feed pipes. The extruder has a Migrandy 30:1 barrier screw with mixing tip. The die is a 42 inch Epoch™ 3201 series die with flex lip manufactured by Cloeren Inc. Properties described herein are with respect to the 20.3 μm film made as described.

For the inventive compositions, the bulk of the composition comprised Exceed™ 3518, which is a metallocene linear low-density polyethylene (mLLDPE). Propylene-α-olefin copolymer was blended into the mLLDPE at 2.5 wt %, 5.0 wt %, and 7.5 wt % levels. An Exact™ plastomer was blended in at the same levels for comparative purposes as these types of resin compositions are commonly used as cling agents in stretch film. Table 1 defines films produced and their compositions. The resins used to make the films described in Table 1 are described in Table 2. Typical processing conditions are highlighted in Table 3 below. Tests and test methods are listed in Table 4 below.

Figure 1:
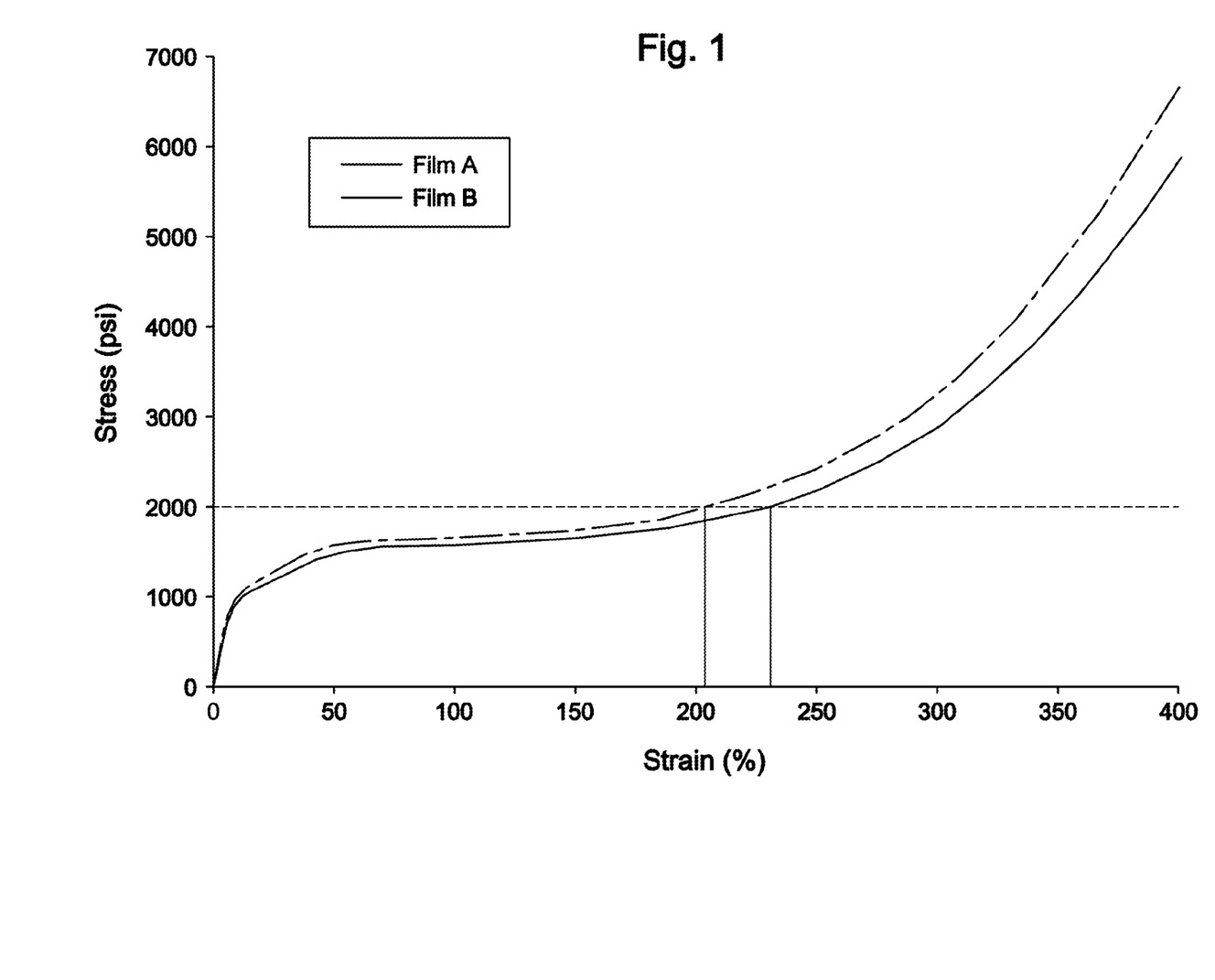
FIG. 1 is a graphical representation of the strain hardening improvement in the film compositions of the invention, wherein the onset of strain hardening improves (increases) as propylene-α-olefin copolymer is added, Stress (psi) as a function of Strain (%) (ASTM D882), and shows the extrapolation from 2000 psi to the value of the Strain.

The onset of strain hardening can be defined as the strain at which the stress begins to increase along at a higher rate or along an acute slope. This is also generally the point where the slope of the Stress/Strain function increases dramatically—the point of maximum rate of slope change. FIG. 1 shows onset of strain hardening defined at 2000 psi. Thus, at 2000 psi stress, Film A has an onset of strain hardening of approximately 202% strain, while Film B has an onset of strain hardening of approximately 227% strain. We would say that Film B has a delayed onset of strain hardening relative to Film A. Film B is a blend of LLDPE and a propylene-α-olefin copolymer ("αPP(#)").

Figure 2:
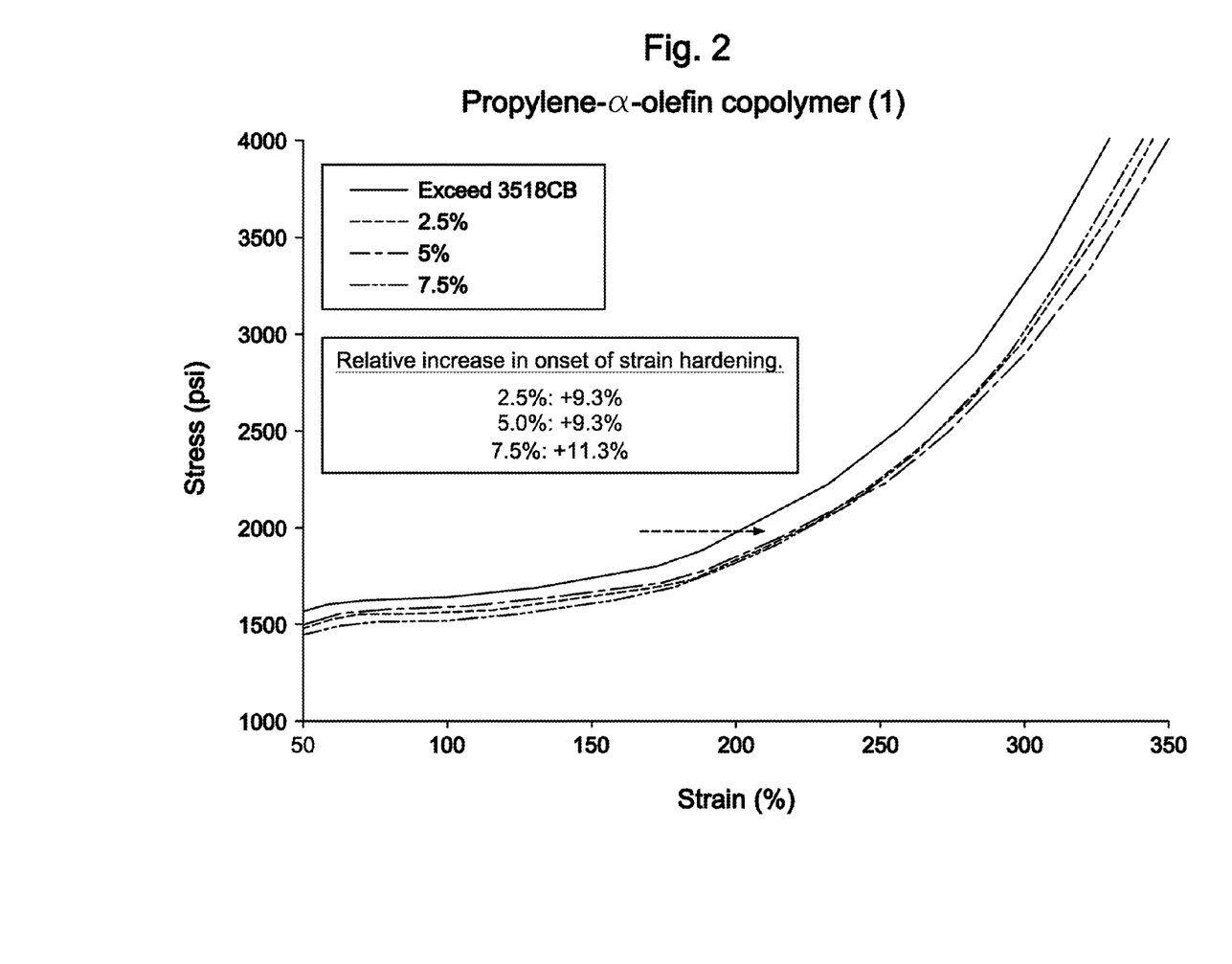
FIG. 2 is a graphical representation of the strain hardening improvement in the film compositions of the invention, wherein the onset of strain hardening improves (increases) as propylene-α-olefin copolymer is added, Stress (psi) as a function of Strain (%)
Figure 3:
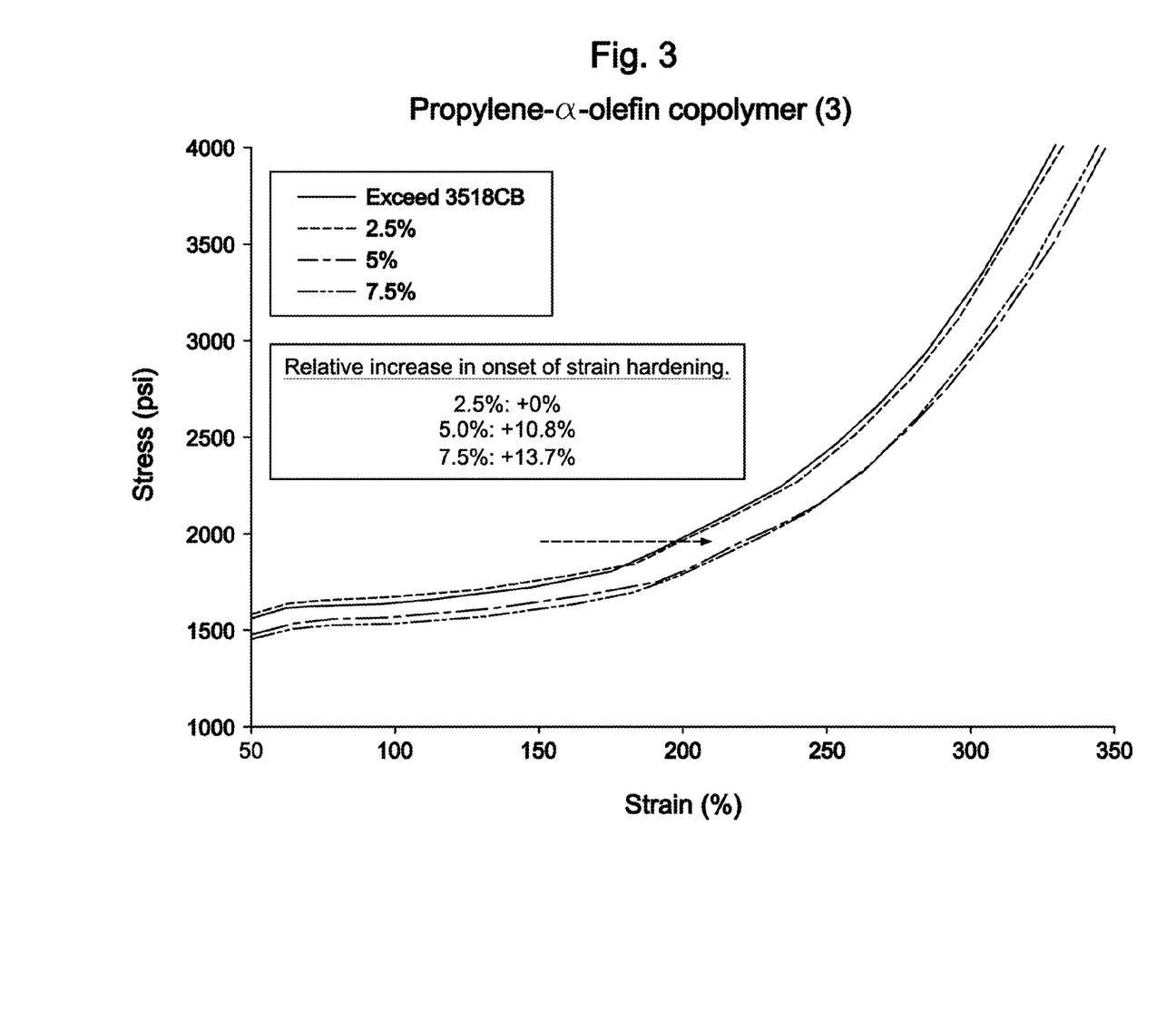
FIG. 3 is a graphical representation of the strain hardening improvement in the film compositions of the invention, wherein the onset of strain hardening improves (increases) as propylene-α-olefin copolymers are added, Stress (psi) as a function of Strain (%).

As can be seen in FIG. 2, when a propylene-α-olefin copolymer (2) is used as a minor blend component with Exceed™, the onset of strain hardening is delayed by up to 11.3% relative to the Exceed alone. This is accomplished by using only 7.5% propylene-α-olefin copolymer. Higher levels of propylene-α-olefin copolymer would certainly improve extensibility even further. As shown in FIG. 3, propylene-α-olefin copolymer (3) enhances extensibility by up to about 14% when blended with Exceed™ 3518 at the 7.5% level. Table 4 reflects the data points at 2000 psi (13.78 MPa) strain from FIGS. 2 and 3.

The properties cited herewith were determined in accordance with the following test procedures. Where any of these properties is referenced in the appended claims, it is to be measured in accordance with the specified test procedure. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge can be measured by any suitable means known in the art. In the present application, Gauge, is reported in mils, and was measured using a Measuretech Series 200 instrument. The instrument measures film thickness using a capacitance gauge. For each film sample, ten film thickness data points were measured per inch of film as the film was passed through the gauge in a transverse direction. From these measurements, an average gauge measurement was determined and reported. Gauge calibration is not checked/verified precisely per ASTM.

Stress/Strain was measured according to ASTM D882, except that for any D882 tests requiring toe correction, this is not calculated precisely per ASTM.

Elmendorf Tear, reported in grams (g) or grams per mil (g/mil), was measured as specified by ASTM D-1922.

Tensile Strength at Yield, reported in pounds per square inch (lb/in² or psi), was measured as specified by ASTM D-882.

Tensile Strength at Break, reported in pounds per square inch (lb/in² or psi), was measured as specified by ASTM D-882.

Tensile Strength at 50%, 100%, and/or 200% Elongation, reported in pounds per square inch (lb/in² or psi), was measured as specified by ASTM D-882.

Ultimate Tensile Strength, reported in pounds per square inch (lb/in² or psi), was measured as specified by ASTM D-882.

Tensile Peak Load, reported in pounds (lb), was measured as specified by ASTM D-882.

Tensile Energy, reported in inch-pounds (in-lb), was measured as specified by ASTM D-882.

Elongation at Yield, reported as a percentage (%), was measured as specified by ASTM D-882.

Elongation at Break, reported as a percentage (%), was measured as specified by ASTM D-882.

1% Secant Modulus (M), reported in pounds per square inch (lb/in² or psi), was measured as specified by ASTM D-882.

Haze, reported as a percentage (%), was measured as specified by ASTM D-1003.

Gloss, a dimensionless number, was measured as specified by ASTM D-2457 at 45°.

Total Energy, reported in foot-pounds (ft-lb), was measured as specified by ASTM D-4272.

Melt Index, $I_{2.16}$, reported in decagrams per minute (dg/min), refers to the melt flow rate measured according to ASTM D-1238, condition E (2.16 kg at 190° C.).

100% Modulus, reported millipascals (mPa), was measured as specified by ASTM D-412.

300% Modulus, reported in millipascals (mPa), was measured as specified by ASTM D-412.

Density, reported in grams per cubic centimeter (g/cm$^3$), was determined using chips cut from plaques compression molded in accordance with ASTM D-1928 Procedure C, aged in accordance with ASTM D-618 Procedure A, and measured as specified by ASTM D-1505.

Dart $F_{50}$, or Dart Drop Impact or Dart Drop Impact Strength (DIS), reported in grams (g) and/or grams per mil (g/mil), was measured as specified by ASTM D-1709, method A, unless otherwise specified. A probe puncture energy test was completed using an Instron Universal tester that records a continuous reading of the force (stress) and penetration (strain) curve. A 6 inch by 6 inch (15 cm by 15 cm) film specimen was securely mounted to a compression load cell to expose a test area 4 inches in diameter (10 cm). Two HDPE slip sheets each 2 inches by 2 inches (5 cm by 5 cm) and each approximately 0.25 mils (6.35 μm) thick were loosely placed on the test surface. A ¾ inch (1.875 cm) diameter elongated matte finished stainless steel probe, traveling at a constant speed of 10 inch/minute (35 cm/min) was lowered into the film, and a stress/strain curve was recorded and plotted. The "puncture force" was the maximum force (pounds) encounter or pounds per mil (lb/mil) encountered. The machine was used to integrate the area under the stress/strain curve, which is indicative of the energy consumed during the penetration to rupture testing of the film, and is reported as "puncture energy" (inch pounds) and/or inch-pounds per mil (in-lb/mil). The probe penetration distance was not recorded in these tests, unless specifically states to the contrary.

TABLE 1

Film Compositions
Monolayer Cast Films

| Sample # | Exceed™ 3518 | αPP(1) | αPP(2) | αPP(3) | Exact™ 5361 |
|---|---|---|---|---|---|
| 001 | 100.0 | — | — | — | — |
| 002 | 97.5 | 2.5 | — | — | — |
| 003 | 95.0 | 5.0 | — | — | — |
| 004 | 92.5 | 7.5 | — | — | — |
| 005 | 97.5 | — | 2.5 | — | — |
| 006 | 95.0 | — | 5.0 | — | — |
| 007 | 92.5 | — | 7.5 | — | — |
| 008 | 97.5 | — | — | 2.5 | — |
| 009 | 95.0 | — | — | 5.0 | — |
| 010 | 92.5 | — | — | 7.5 | — |
| 011 | 97.5 | — | — | — | 2.5 |
| 012 | 95.0 | — | — | — | 5.0 |
| 013 | 92.5 | — | — | — | 7.5 |

Composition (wt %)

TABLE 2

Description of Film Components

| Property | Exceed™ 3518 | αPP(1) | αPP(2) | αPP(3) | Exact™ 5361 |
|---|---|---|---|---|---|
| Density, g/cm$^3$ | 0.918 | 0.858 | 0.871 | 0.860 | 0.860 |
| Melt Index (2.16 kg @ 190° C.), dg/min | 3.5 | — | — | — | 3.0 |
| Melt Flow Rate (2.16 kg @ 230° C.), dg/min | — | 3.0 | 8.0 | 20.0 | — |

TABLE 3

Film Processing Conditions

| Extruder | Value |
|---|---|
| Zone 1 (° C.) | 188 |
| Zone 2 (° C.) | 232 |
| Zone 3 (° C.) | 238 |
| Zone 4 (° C.) | 243 |
| Zone 5 (° C.) | 249 |
| Zone 6 (° C.) | 249 |
| Melt Temperature (° C.) | 248 |
| Head Pressure (MPa) | 24 |
| Chill Roll Temperature (° C.) | 27 |

TABLE 4

Data Summary Table

| Amt. of Additive | Strain at 2000 psi (13.78 MPa) |
|---|---|
| Exceed™ 3518CB | 202 |
| α-PP(1), 0.0% | 204 |
| 2.5% | 223 |
| 5.0% | 223 |
| 7.5% | 227 |
| α-PP(2), 0.0% | 204 |
| 2.5% | 218 |
| 5.0% | 218 |
| 7.5% | 225 |
| α-PP(3), 0.0% | 204 |
| 2.5% | 204 |
| 5.0% | 227 |
| 7.5% | 232 |
| Exact™ 5361, 0.0% | 204 |
| 2.5% | 211 |
| 5.0% | 201 |
| 7.5% | 195 |

TABLE 5

Film Properties

| Property | 001 | 002 | 003 | 004 | 005 | 006 | 007 | 008 |
|---|---|---|---|---|---|---|---|---|
| Tensile @ Yield (psi) | | | | | | | | |
| MD | 939 | 908 | 909 | 861 | 954 | 915 | 905 | 1,017 |
| TD | 820 | 831 | 856 | 798 | 895 | 879 | 805 | 882 |
| at 200% MD | 1,984 | 1,875 | 1,850 | 1,820 | 1,880 | 1,888 | 1,855 | 1,987 |

TABLE 5-continued

Film Properties

| | | | | | | | | |
|---|---|---|---|---|---|---|---|---|
| Ultimate Tensile (psi) | | | | | | | | |
| MD | 8,816 | 8,231 | 8,191 | 8,760 | 8,980 | 8,957 | 8,495 | 9,212 |
| TD | 6,306 | 6,060 | 6,141 | 5,841 | 6,355 | 6,542 | 5,370 | 5,603 |
| Elongation @ Yield (%) | | | | | | | | |
| MD | 8.3 | 8.2 | 8.2 | 9.1 | 8.7 | 8.3 | 8.3 | 9.7 |
| TD | 7.3 | 8.1 | 7.5 | 9.3 | 9.5 | 7.5 | 7.8 | 11.1 |
| Break Elongation (%) | | | | | | | | |
| MD | 449 | 453 | 461 | 464 | 474 | 466 | 458 | 455 |
| TD | 695 | 696 | 687 | 710 | 721 | 723 | 676 | 677 |
| 1% Secant (psi) | | | | | | | | |
| MD | 15,259 | 15,415 | 14,723 | 13,336 | 15,091 | 14,672 | 14,599 | 15,511 |
| TD | 17,666 | 17,020 | 15,769 | 15,832 | 16,969 | 16,941 | 16,132 | 17,517 |
| Elmendorf Tear | | | | | | | | |
| MD (g) | 147 | 150 | 136 | 115 | 147 | 155 | 137 | 132 |
| TD (g) | 378 | 381 | 380 | 369 | 402 | 394 | 433 | 374 |
| MD (g/mil) | 188 | 185 | 164 | 142 | 180 | 187 | 167 | 167 |
| TD (g/mil) | 478 | 453 | 447 | 434 | 502 | 486 | 521 | 474 |
| Dart Drop Method A | | | | | | | | |
| (g) | 396 | 428 | 339 | 321 | 264 | 234 | 189 | 279 |
| (g/mil) | 471 | 515 | 404 | 382 | 322 | 285 | 236 | 358 |
| Haze (%) | 2.8 | 1.9 | 2.0 | 2.5 | 1.8 | 1.7 | 1.7 | 1.7 |
| Gloss 45° | | | | | | | | |
| MD | 85 | 90 | 89 | 78 | 91 | 91 | 91 | 91 |
| TD | 86 | 90 | 89 | 77 | 90 | 90 | 91 | 92 |
| Puncture | | | | | | | | |
| Peak Force (lb) | 9.89 | 10.03 | 11.20 | 9.65 | 11.09 | 10.27 | 9.67 | 9.54 |
| Peak Force (lb/mil) | 11.77 | 12.09 | 13.33 | 11.49 | 13.52 | 12.53 | 12.08 | 12.23 |
| Break Energy (in-lb) | 35.15 | 34.60 | 40.93 | 33.23 | 40.71 | 36.55 | 34.12 | 32.96 |
| Break Energy (in-lb/mil) | 41.85 | 41.69 | 48.73 | 39.55 | 49.65 | 44.58 | 42.65 | 42.25 |
| Cling (grams) | | | | | | | | |
| 0% | 55 | 132 | 121 | 52 | 62 | 116 | 142 | 146 |
| 200% | 41 | 72 | 72 | 122 | 65 | 88 | 86 | 72 |

| Property | 009 | 010 | 011 | 012 | 013 |
|---|---|---|---|---|---|
| Tensile @ Yield (psi) | | | | | |
| MD | 965 | 898 | 897 | 881 | 861 |
| TD | 812 | 786 | 824 | 791 | 759 |
| at 200% MD | 1,838 | 1,784 | 1,933 | 1,861 | 1,862 |
| Ultimate Tensile (psi) | | | | | |
| MD | 8,762 | 7,960 | 8,865 | 7,824 | 8,550 |
| TD | 5,313 | 5,143 | 6,214 | 6,231 | 5,981 |
| Elongation @ Yield (%) | | | | | |
| MD | 10.3 | 9.0 | 8.3 | 8.7 | 8.8 |
| TD | 7.8 | 8.0 | 7.6 | 8.2 | 7.6 |
| Break Elongation (%) | | | | | |
| MD | 464 | 452 | 454 | 439 | 454 |
| TD | 694 | 689 | 690 | 717 | 707 |
| 1% Secant (psi) | | | | | |
| MD | 14,495 | 13,867 | 14,605 | 14,191 | 13,460 |
| TD | 14,802 | 14,578 | 16,422 | 15,973 | 14,901 |
| Elmendorf Tear | | | | | |
| MD (g) | 127 | 123 | 142 | 153 | 140 |
| TD (g) | 399 | 361 | 362 | 393 | 377 |

TABLE 5-continued

| Film Properties | | | | | |
|---|---|---|---|---|---|
| MD (g/mil) | 160 | 155 | 169 | 178 | 165 |
| TD (g/mil) | 525 | 463 | 426 | 474 | 449 |
| Dart Drop Method A | | | | | |
| (g) | 273 | 231 | 273 | 437 | 345 |
| (g/mil) | 346 | 296 | 317 | 514 | 397 |
| Haze (%) | 1.5 | 2.3 | 2.7 | 2.1 | 2.4 |
| Gloss 45° | | | | | |
| MD | 91 | 85 | 87 | 90 | 89 |
| TD | 91 | 84 | 87 | 89 | 88 |
| Puncture | | | | | |
| Peak Force (lb) | 9.56 | 8.77 | 10.67 | 11.69 | 10.25 |
| Peak Force (lb/mil) | 12.10 | 11.25 | 12.40 | 13.75 | 11.78 |
| Break Energy (in-lb) | 34.85 | 32.67 | 36.68 | 40.81 | 36.56 |
| Break Energy (in-lb/mil) | 44.11 | 41.89 | 42.66 | 48.01 | 42.02 |
| Cling (grams) | | | | | |
| 0% | 136 | 72 | 58 | 67 | 74 |
| 200% | 103 | 132 | 46 | 52 | 54 |

Having described the invention in its various aspects, in numbered embodiments herein is:

1. A film comprising greater than 70 wt %, based on the weight of the film, of a core layer comprising a core composition comprising:
    (a) within the range of from 50 to 99 wt % linear low density polyethylene based on the weight of the core composition; and
    (b) within the range of from 1 to 50 wt % propylene-α-olefin copolymer based on the weight of the core composition, wherein the propylene-α-olefin copolymer possesses:
        (i) a melting temperature ($T_m$) of less than 105° C., and
        (ii) a heat of fusion ($H_f$) of less than 75 J/g.

2. The film of embodiment 1, comprising within the range from 70 to 90 wt %, by weight of the film, of one or more core layers, and within the range from 10 to 30 wt %, by weight of the film, of one or more outer layers, wherein the core layer comprises the core composition.

3. The film of embodiment 2, the one or more outer layer(s) comprising at least one non-cling layer and at least one cling layer.

4. The film of embodiment 1, wherein the propylene-α-olefin copolymer comprises within the range of 5 to 35 wt %, by weight of the propylene-α-olefin copolymer, of ethylene- or $C_4$-$C_{10}$ α-olefin-derived units.

5. The film of embodiment 4, wherein the propylene-α-olefin copolymer comprises within the range of 8 to 25 wt %, by weight of the propylene-α-olefin copolymer, ethylene-derived units.

6. The film of embodiment 1, wherein the propylene-α-olefin copolymer also possesses a triad tacticity of three propylene units, as measured by $^{13}$C NMR, of 75% or greater.

7. The film of embodiment 1, wherein the propylene-α-olefin copolymer also possesses a density within the range of 0.850 to 0.920 g/cm³.

8. The film of embodiment 1, wherein the propylene-α-olefin copolymer also possesses a melt flow rate (ASTM D1238, 2.16 kg, 230° C.) within the range of 2 to 30 dg/min.

9. The film of embodiment 1, wherein the linear low density polyethylene possesses a melt index (ASTM D1238, 2.16 kg, 190° C.) within the range from 0.5 to 10 dg/min.

10. The film of embodiment 1, wherein the linear low density polyethylene possesses a density within the range from 0.880 to 0.925 g/cm³.

11. The film of embodiment 1, wherein the core composition consists essentially of greater than 50 wt % linear low density polyethylene and from 50 wt % or less propylene-α-olefin copolymer.

12. The film of embodiment 1, wherein the core composition comprises within the range of from 80 to 99 wt % linear low density polyethylene; and within the range of from 1 to 20 wt % propylene-α-olefin copolymer.

13. The film of embodiment 1, wherein the core composition comprises within the range of from 85 to 98 wt % linear low density polyethylene; and within the range of from 2 to 15 wt % propylene-α-olefin copolymer.

14. The film of embodiment 1, wherein a 20.3 μm thick film consisting of the core composition possesses a Break Energy of greater than 35.0 lb·inch/mil (0.155 N·m/μm).

15. The film of embodiment 1, wherein a 20.3 μm thick film comprising the core composition possesses a Strain Hardening value at 2000 psi (13.78 MPa) within the range of from greater than 2% relative to a 20.3 μm film consisting of the linear low density polyethylene.

16. The film of embodiment 1, wherein the film is cast film.

17. A film comprising:
    (a) within the range of from 50 to 99 wt % linear low density polyethylene based on the weight of the core composition; and
    (b) within the range of from 1 to 50 wt % propylene-α-olefin copolymer based on the weight of the core composition, wherein the propylene-α-olefin copolymer possesses:
        (i) a melting temperature ($T_m$) of less than 105° C., and
        (ii) a heat of fusion ($H_f$) of less than 75 J/g;
        wherein the film is a cast film.

18. The film of embodiment 17, wherein the propylene-α-olefin copolymer comprises within the range of 5 to 35 wt %, by weight of the propylene-α-olefin copolymer, of ethylene- or $C_4$-$C_{10}$ α-olefin-derived units.

19. The film of embodiment 17, wherein the propylene-α-olefin copolymer comprises within the range of 8 to 25 wt %, by weight of the propylene-α-olefin copolymer, ethylene-derived units.

20. The film of embodiment 17, wherein the propylene-α-olefin copolymer also possesses triad tacticity of three propylene units, as measured by $^{13}$C NMR, of 75% or greater.
21. The film of embodiment 17, wherein the propylene-α-olefin copolymer also possesses a density within the range of 0.850 to 0.920 g/cm$^3$.
22. The film of embodiment 17, wherein the propylene-α-olefin copolymer also possesses a melt flow rate (ASTM D1238, 2.16 kg, 230° C.) within the range of 2 to 30 dg/min.
23. The film of embodiment 17, wherein the linear low density polyethylene possesses a melt index (ASTM D1238, 2.16 kg, 190° C.) within the range from 0.5 to 10 dg/min.
24. The film of embodiment 17, wherein the linear low density polyethylene possesses a density within the range from 0.880 to 0.925 g/cm$^3$.
25. A multi-layer film possessing, as at least one layer, the film of embodiment 1.

Another aspect is directed to the use of a core composition in forming at least one layer of a single or multi-layered film, the film comprising greater than 70 wt %, based on the weight of the film, of the at least one layer comprising a core composition comprising: (a) within the range of from 50 to 99 wt % linear low density polyethylene based on the weight of the core composition; and (b) within the range of from 1 to 50 wt % propylene-α-olefin copolymer based on the weight of the core composition, wherein the propylene-α-olefin copolymer possesses: (i) a melting temperature ($T_m$) of less than 105° C., and (ii) a heat of fusion ($H_f$) of less than 75 J/g.

What is claimed is:

1. A cast film comprising greater than 70 wt %, based on the weight of the cast film, of a core layer comprising a core composition comprising:
   (a) 50 to 99 wt % linear low density polyethylene based on the weight of the core composition; and
   (b) 1 to 50 wt % propylene-α-olefin copolymer based on the weight of the core composition, wherein the propylene-α-olefin copolymer comprises from 5 to 35 wt % of units derived from ethylene, less than or equal to 5 wt % of units derived from diene, with the balance being units derived from propylene, based on the total weight of the propylene-α-olefin copolymer, and wherein the propylene-α-olefin copolymer possesses:
      (i) a melting temperature ($T_m$) of less than 105° C.,
      (ii) a heat of fusion ($H_f$) of less than 75 J/g,
      (iii) a melt flow rate of 2 to 30 dg/min, and
      (iv) a density of 0.850 to 0.890 g/cm$^3$,
   wherein the cast film is formed by using casting techniques, and has a MD gloss measured at a 45° angle of from about 89 to about 95 and a TD gloss measured at a 45° angle of from about 89 to about 95; and
   wherein a 20.3 μm thick cast film comprising the core composition possesses a strain hardening value at 2000 psi (13.78 MPa) of greater than 2% greater than the strain hardening value at 2000 psi of a 20.3 μm thick cast film comprising a core layer comprising a core composition consisting of only the linear low density polyethylene.

2. The cast film of claim 1, comprising 70 to 90 wt %, by weight of the cast film, of one or more core layers, and 10 to 30 wt %, by weight of the cast film, of one or more outer layers, wherein the core layer(s) comprises the core composition.

3. The cast film of claim 2, the one or more outer layer(s) comprising at least one non-cling layer and at least one cling layer.

4. The cast film of claim 1, wherein the propylene-α-olefin copolymer comprises 8 to 18 wt %, by weight of the propylene-α-olefin copolymer, of ethylene-derived units.

5. The cast film of claim 1, wherein the propylene-α-olefin copolymer also possesses a triad tacticity of three propylene units, as measured by $^{13}$C NMR, of 75% or greater.

6. The cast film of claim 1, wherein the linear low density polyethylene possesses a density of 0.880 to 0.925 g/cm$^3$.

7. The cast film of claim 1, wherein the core composition consists essentially of 50 to 99 wt % of the linear low density polyethylene and 1 to 50 wt % of the propylene-α-olefin copolymer, based on the weight of the core composition.

8. The cast film of claim 1, wherein the core composition comprises 80 to 99 wt % of the linear low density polyethylene; and 1 to 20 wt % of the propylene-α-olefin copolymer, based on the weight of the core composition.

9. The cast film of claim 1, wherein the core composition comprises 85 to 98 wt % of the linear low density polyethylene; and 2 to 15 wt % of the propylene-α-olefin copolymer, based on the weight of the core composition.

10. The cast film of claim 1, wherein a 20.3 μm thick film consisting of the core composition possesses a Break Energy of greater than 40.0 lb-inch/mil (0.177 N·m/μm).

11. A method of forming the cast film of claim 1, comprising (1) forming a melt blend at a temperature of from 150 to 350° C. of the (a) 50 to 99 wt % linear low density polyethylene based on the weight of the core composition; and the (b) 1 to 50 wt % propylene-α-olefin copolymer based on the weight of the core composition; (2) in a cast film line/extruder wherein the extruder has a L/D of from 50:1 to 20:1, and a die temperature of from 150 to 350° C.

12. The method of forming the cast film of claim 11, wherein the cast film line is run at a throughput of from 100 to 1000 kg/hr and a line speed of from 100 to 1000 m/min.

13. The method of forming the cast film of claim 11, wherein the cast film line possesses a roll temperature of from 0 to 70° C.

14. A cast film comprising a core composition comprising:
   (a) 80 to 99 wt % linear low density polyethylene based on the weight of the core composition, wherein the linear low density polyethylene comprises ethylene-derived units and less than 10 wt % comonomer-derived units, and wherein the linear low density polyethylene has a density of from 0.916 to 0.940 g/cm$^3$; and
   (b) 1 to 20 wt % propylene-α-olefin copolymer based on the weight of the core composition, wherein the propylene-α-olefin copolymer comprises from 5 to 35 wt % of units derived from ethylene, less than or equal to 5 wt % of units derived from diene, with the balance being units derived from propylene, based on the total weight of the propylene-α-olefin copolymer, and wherein the propylene-α-olefin copolymer possesses:
      (i) a melting temperature ($T_m$) of less than 105° C.,
      (ii) a heat of fusion ($H_f$) of less than 75 J/g,
      (iii) a density of 0.850 to 0.890 g/cm$^3$,
      (iv) a melt flow rate of less than 30 g/10 min, and
      (v) a molecular weight distribution of less than 3,
   wherein the cast film is formed by using casting techniques, and has a MD gloss measured at a 45° angle of from about 89 to about 95 and a TD gloss measured at a 45° angle of from about 89 to about 95, and
   wherein a 20.3 μm thick film comprising the core composition possesses a strain hardening value at 2000 psi (13.78 MPa) of greater than 2% greater than the strain hardening value at 2000 psi of a 20.3 μm thick film comprising a core composition consisting of only the linear low density polyethylene.

* * * * *